(12) United States Patent
Kato

(10) Patent No.: US 7,537,363 B2
(45) Date of Patent: May 26, 2009

(54) INSERT MOLDING DIAL STRUCTURE

(75) Inventor: Takahira Kato, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 98 days.

(21) Appl. No.: 11/713,109

(22) Filed: Mar. 1, 2007

(65) Prior Publication Data
US 2008/0209748 A1    Sep. 4, 2008

(51) Int. Cl.
*B60Q 1/26* (2006.01)
(52) U.S. Cl. ..................... 362/489; 362/471
(58) Field of Classification Search .......... 362/23, 362/27–29, 471, 482, 488–489, 570–571, 362/462–463, 34, 104, 458, 565, 551, 556, 362/555, 559, 84–86, 89; 116/284–305; 340/815.78–81; 368/228, 232, 234
See application file for complete search history.

(56) References Cited

U.S. PATENT DOCUMENTS

| | | | |
|---|---|---|---|
| D380 S * | 6/1851 | Sarvarnias | D7/405 |
| 4,253,177 A * | 2/1981 | Hafner | 368/187 |
| 6,904,866 B2 * | 6/2005 | Furuya | 116/286 |
| 2002/0089837 A1 * | 7/2002 | Kneer et al. | 362/26 |
| 2002/0189526 A1 * | 12/2002 | Sugimoto | 116/286 |
| 2005/0201076 A1 * | 9/2005 | Marcelle et al. | 362/23 |

\* cited by examiner

*Primary Examiner*—Jong-Suk (James) Lee
*Assistant Examiner*—Julie A Shallenberger
(74) *Attorney, Agent, or Firm*—Harness, Dickey & Pierce, PLC

(57) ABSTRACT

A vehicle instrument cluster gauge may have a dial plate with an inner dial, an outer dial, indicia and graduations. The graduations may originate on a dial plate rear surface near or at the center of the gauge and traverse radially outward toward the outer or peripheral edge of the dial plate and wrap from the rear surface, around the peripheral edge and onto the front surface of the dial plate thereby creating a three-dimensional gauge structure with the dial plate. When on the dial surface, the front graduation part protrudes above and away from the outer dial face of the dial plate. The graduation may also create an overhang or cantilever by protruding over a front surface of the outer dial, and have edges formed by 90 degree surfaces and have a projected centerline directed radially through a geometric center of the dial plate, where a pointer may mount.

16 Claims, 4 Drawing Sheets

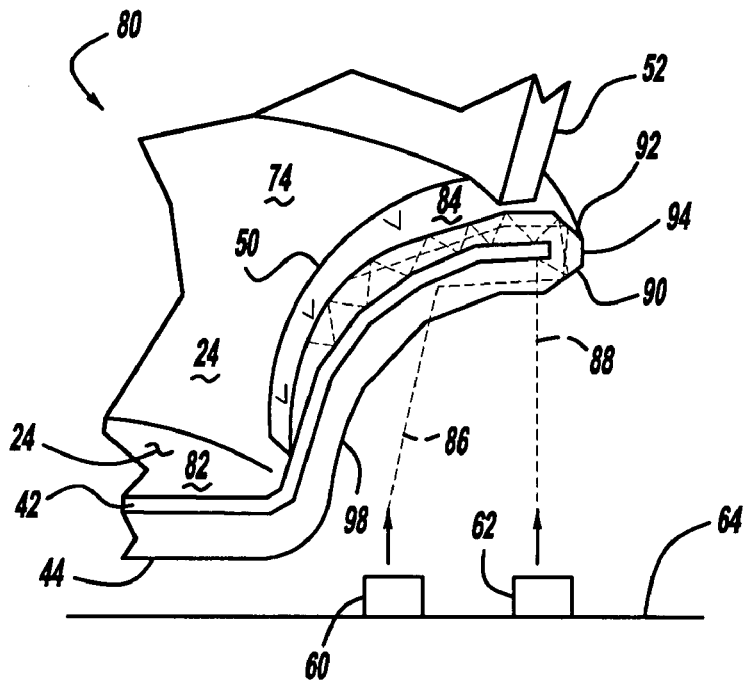
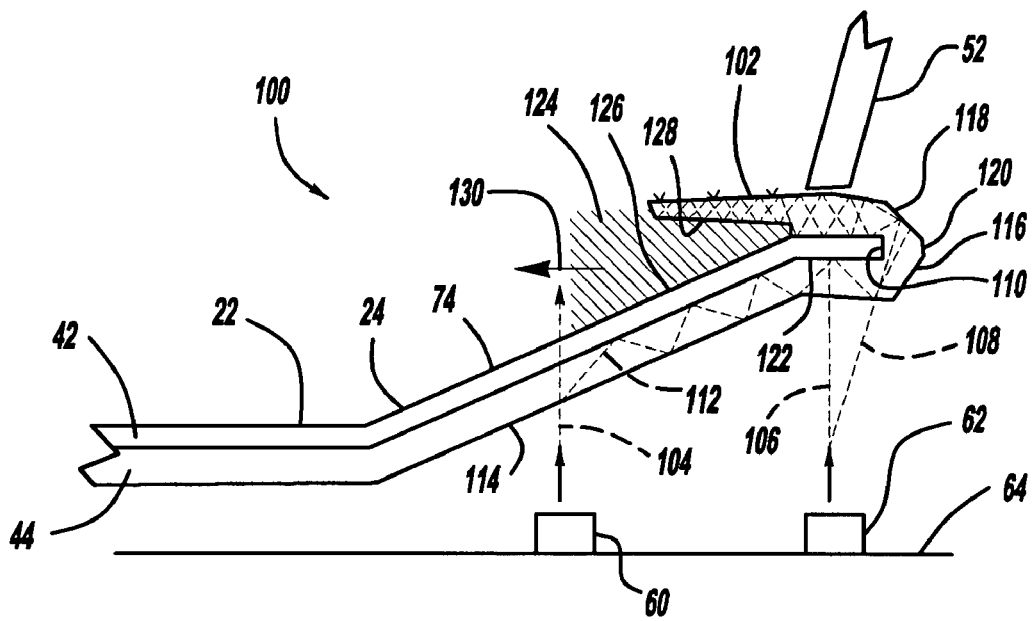

INSERT MOLDING DIAL STRUCTURE

FIELD

The present disclosure relates to instrument panel gauges in vehicles and more particularly to an instrument panel gauge presenting a three-dimensional viewing arrangement.

BACKGROUND

The statements in this section merely provide background information related to the present disclosure and may not constitute prior art. Instrument clusters on automobiles generally include a plurality of gauges for displaying operational information such as vehicle speed, engine RPM, engine temperature, fuel level and other information related to driving or vehicle conditions. The gauges may include analog or digital readings for displaying the information depending on manufacturer and styling preferences. An analog gauge typically includes a faceplate having indicia thereon such as numbers and a pointer for rotating to the appropriate number.

One design consideration for an instrument cluster and related gauges is the ability of a vehicle operator to easily view and read the gauges in all driving environments. In particular, nighttime driving requires the instrument cluster to illuminate in some fashion such that the numbers and indicia are quickly and easily discernible. One method of making the instrument cluster more quickly easily discernible is to use three-dimensional gauge faces; however, such three dimensional gauge faces have not been without their share of problems. For instance, turning to FIGS. 3 and 4, one example of a prior art, three dimensional gauge is depicted; however, the graduations do not have sharp corners, and thus the appearance of the three-dimensional is quite markedly diminished, especially when illuminated. Such rounded corners of the graduations are due to the single-sheet, sheet forming process which is used for the face and graduations. Generally, steep or sharp angles of certain sheet molded parts have not been achievable. Steep and sharp edges of a gauge graduation permit light to be better conveyed to an observer and create more precise markings for accompanying indicia around a gauge face.

What is needed then is a device that does not suffer from the above disadvantages, which in turn will provide a three-dimensional gauge face with graduations having sharp and or steep edges and possessing the capability of carrying and transmitting light to demark indicia. Furthermore, such gauge graduations will also be easily molded in conjunction with or successively with the gauge dial.

SUMMARY

A gauge or indicating instrument of a vehicle instrument cluster may have an inner dial and an outer dial, which collectively may be referred to as a dial or face. Graduations may be disposed upon a front surface of the dial by a molding process. Such graduations may begin on a rear surface of the dial and may proceed, as a single, continuous molded piece, around an outer peripheral edge of the outer dial and onto the front surface. In this way, a graduation may be considered to wrap around the outer peripheral edge of the dial from the rear surface to the front surface. On the front surface, the graduation may project away from or above the dial face, thereby creating a three-dimensional gauge face.

In an alternative arrangement, using slide core tooling for example, the graduation may be manufactured to protrude over the front surface of the dial and leave space between the dial and the graduation in a cantilever type of arrangement. The graduations may be situated adjacent indicia at various positions around the dial, such as at every five miles per hour, on the inner or outer dial, and a centerline of the graduation may be directed radially through a center of the gauge. The structure of a graduation may have sharp edges formed by intersecting walls of the graduation.

In another arrangement, the graduation may be formed at a steep angle relative to the adjacent dial or printed circuit board. The graduation may be convex and disposed upon a front surface of the outer dial, and similar to prior examples, the graduation may begin on a rear surface of the outer dial and wrap radially around an outer peripheral edge of the outer dial and onto the front surface. As is possible for all arrangements, a radial centerline of the graduation may pass through the geometric canter of the gauge.

A light emitting diode or other light source may project light through the dial, which may be translucent, transparent, or opaque, to illuminate the indicia and any graduations that may be located in the dial surface, and the graduations that are three-dimensional on the surface of the dial and which wrap from the rear of the dial to the front of the dial. Alternatively, the graduations that are three-dimensional on the surface of the dial and which wrap from the rear of the dial to the front of the dial, and the graduations that may be three-dimensional and cantilevered over the dial, may be illuminated by light emitting diode(s) that project light into the graduation portion located on the rear of dial and which then is transmitted through the rear graduation portion to the front graduation portion to illuminate the front portion on the dial surface or the cantilevered portion of the graduation, whichever applies. As with all three-dimensional graduations according to the present teachings, sharp graduation edges formed by surfaces that meet at 90 degrees or approximately 90 degrees are achievable.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a side view of a dial structure in accordance with the teachings of the present invention; and FIG. 7 is a side view of a dial structure in accordance with the teachings of the present invention.

DETAILED DESCRIPTION

Figure 1:
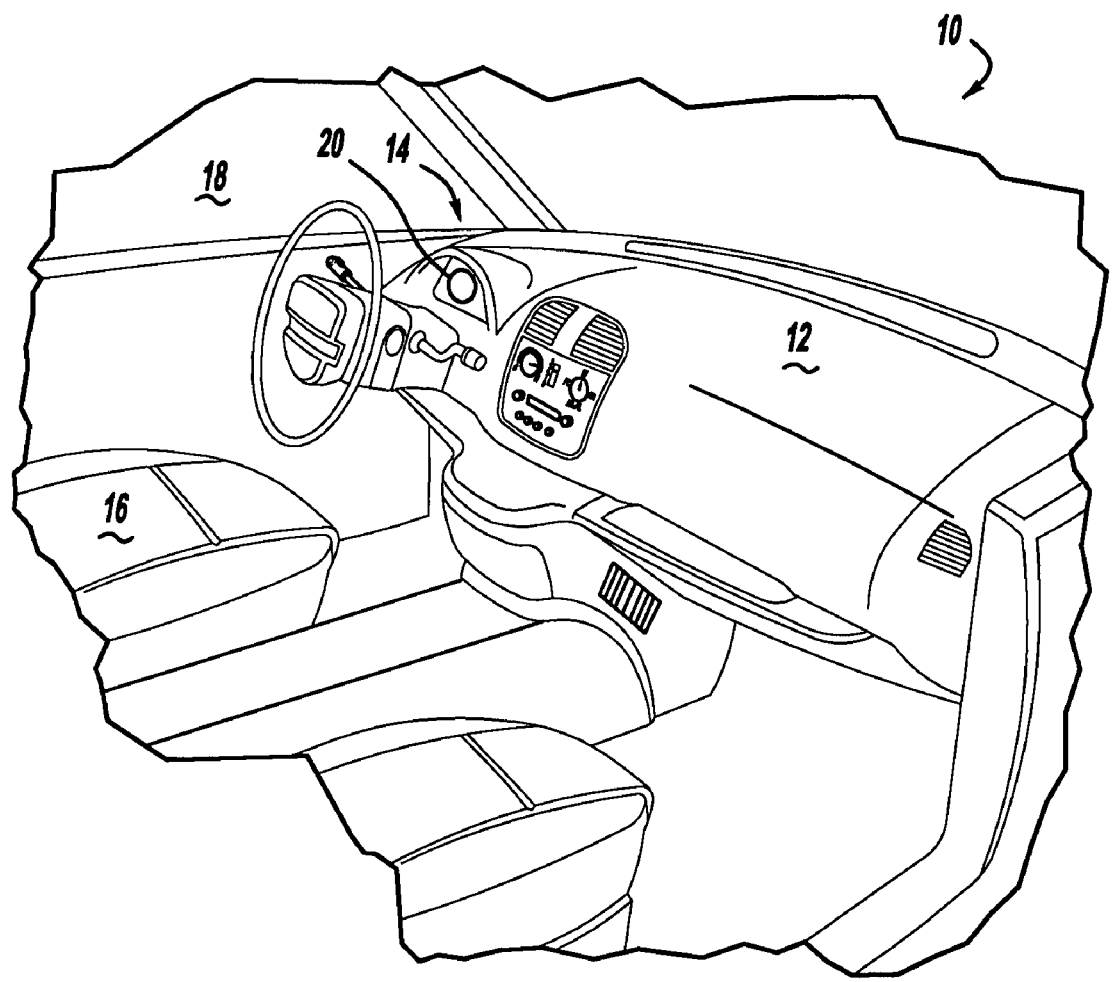
FIG. 1 is a perspective view of an interior dash of a vehicle depicting a location of a gauge.

The following description is merely exemplary in nature and is not intended to limit the present disclosure, application, or uses. It should be understood that throughout the drawings, corresponding reference numerals indicate like or corresponding parts and features. With initial reference to FIG. 1, depicted is a vehicle 10, such as an automobile, having a dash 12 and an instrument cluster 14, both of which may be situated in front of a driver's seat 16 in the interior cabin 18 of the vehicle 10. As part of the instrument cluster 14, a viewed component 20, which may be exemplified by a gauge or instrument, such as a speedometer, is depicted. It is appreciated that the viewed component 20 may be exemplified by other gauges, dials or instruments such as, but not limited to, tachometers, fuel gauges, temperature gauges, oil pressure gauges, etc. For purposes of this description, the viewed component 20 will be referred to as a speedometer.

Figure 2:
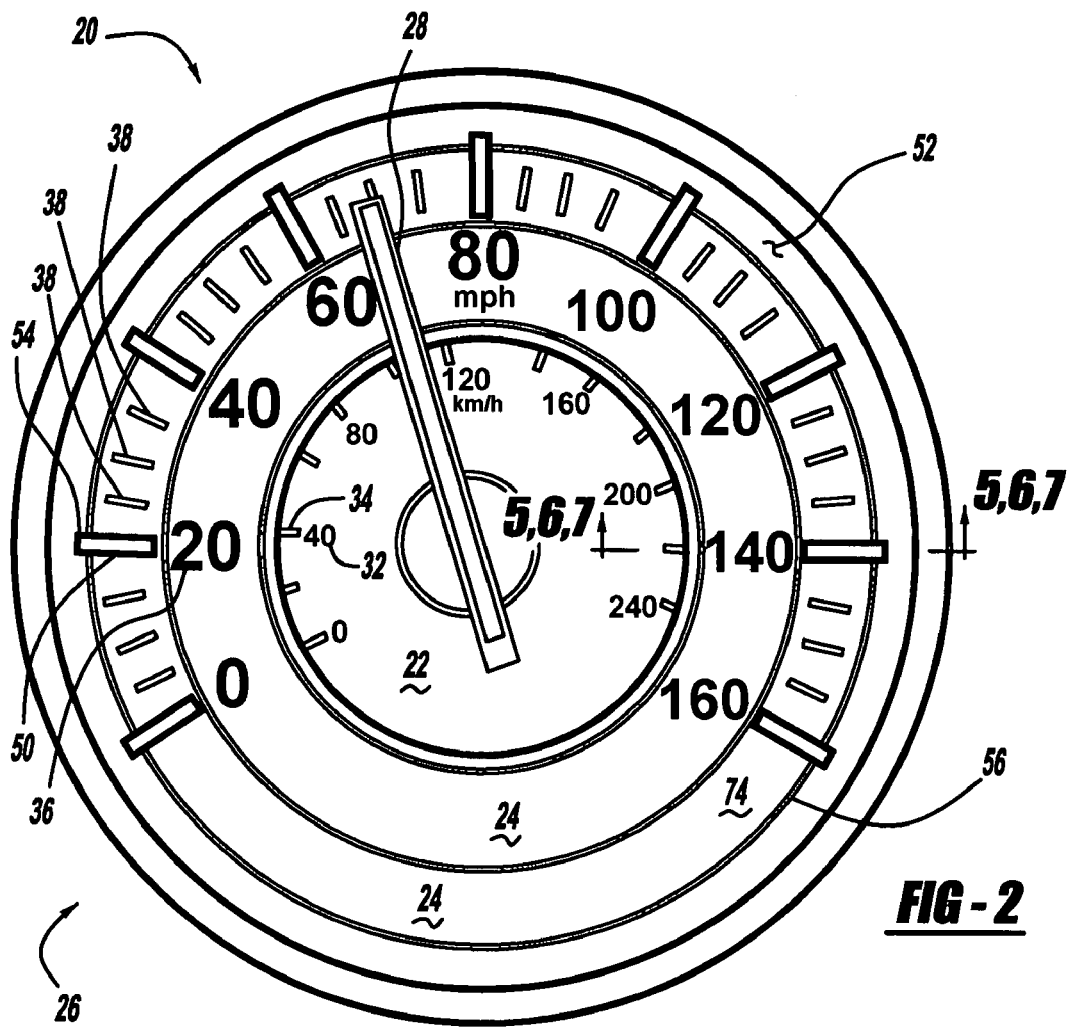
FIG. 2 is a front view of a gauge constructed in accordance with teachings of the present invention.
Figure 3:
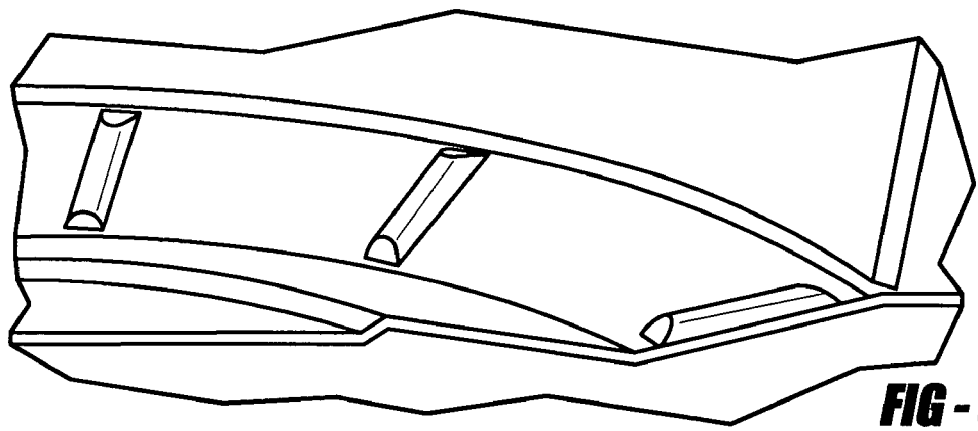
FIG. 3 is a perspective view of a gauge face depicting locations of graduations of the prior art.

Turning now to FIG. 2, the speedometer 20 generally includes an inner dial 22, and an outer dial 24, a pointer 28, and an outer casing or housing 52. The inner dial 22 and outer dial 24 may collectively and generally be referred to as a dial 26 or face plate. As an example, the inner dial 22 may denote kilometers per hour (km/h) with accompanying inner indicia 32 and inner graduations 34 while the outer dial 24 may denote miles per hour (mph) using accompanying outer indicia 36 and outer graduations 38. As the pointer 28 rotates around the dial 26, corresponding Km/h of the inner dial 22 and mph of the outer dial 24 are indicated.

Figures 4, 5:
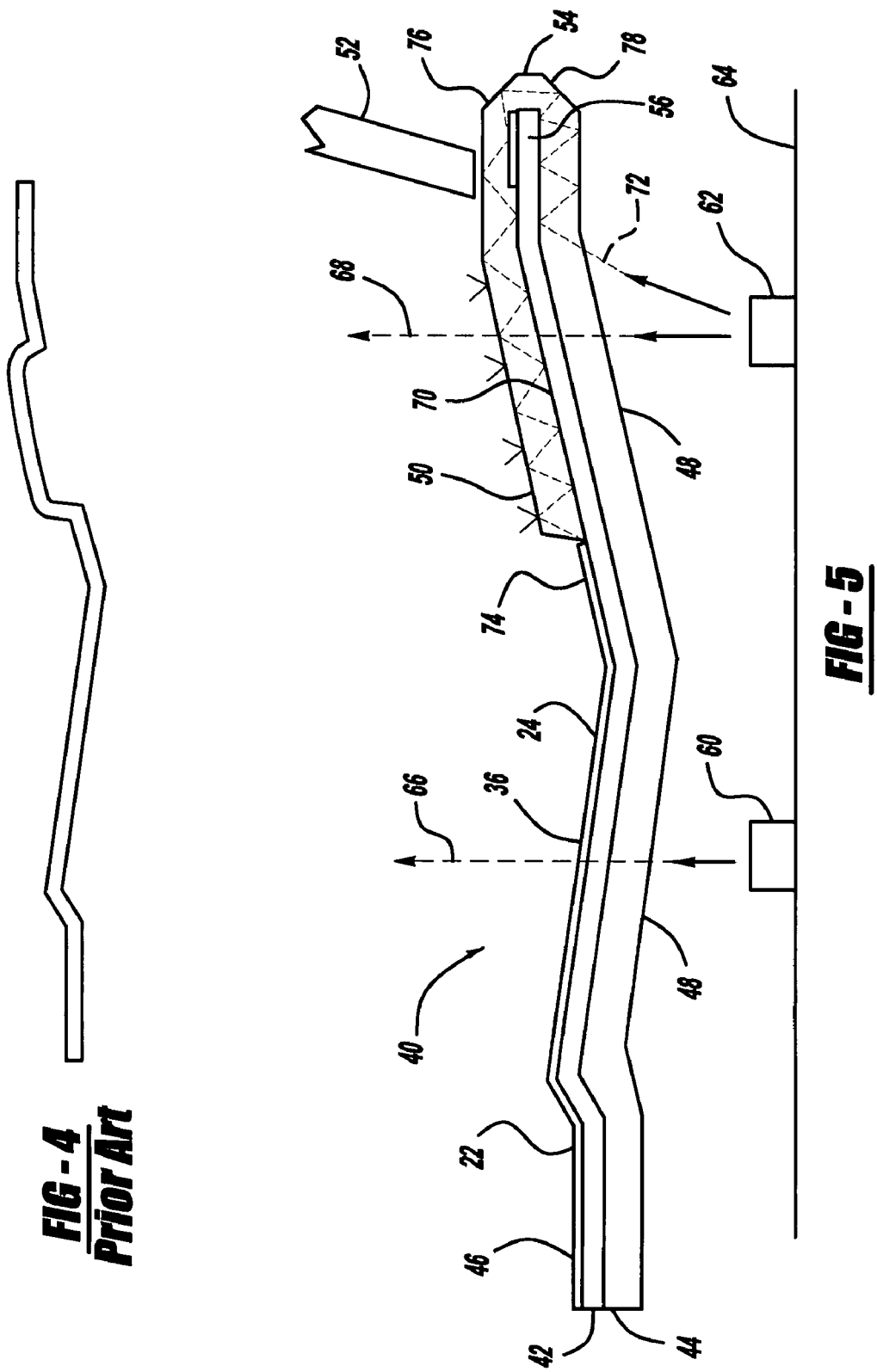
FIG. 4 is a side view of a dial structure of the prior art.
FIG. 5 is a side view of a dial structure in accordance with the teachings of the present invention.

With reference to FIGS. 1-2 and 5-7, a speedometer 20 having a three-dimensional viewing surface offering an observer an easy to view and read instrument face in accordance with the teachings of the present invention will now be described. FIG. 5 depicts a side view of a dial structure 40 that may include a polycarbonate dial plate 42, a molded resin layer 44, and a graphic printing layer 46. As depicted in FIG. 5, the molded resin layer 44 has multiple sections, each of which may be referred to separately for ease of description. For instance, the molded resin layer 44 may be described as having a rear or bottom graduation part 48 and a front or top graduation part 50 that lies adjacent to the gauge's outer casing or housing 52. The side of the dial plate 42 having the front gradation part 50 is known as the front surface, while the opposite side of the dial plate 42 is known as the rear surface. The housing 52 may act as a mask or shield to prevent any outside light from intruding onto the gauge face that may cause a viewer of the dial 26, with its lighted inner and outer indicia 32, 36, to see washed out indicia. In other words, during twilight episodes of lighting, when the indicia 32, 36 are initially illuminated or turned on, the housing 52 acts as a shield that blocks outside light, such as sunlight or other surrounding light, that might otherwise make the illuminated indicia 32, 36 appear less illuminated. The housing 52, acting as a casing, may also serve to provide an easily recognizable dial face, free of wash out, at which a viewer's eyes may quickly and easily focus.

Continuing with FIG. 5, the resin layer 44 has an edge graduation part 54 that is intermediate to the rear graduation part 48 and front graduation part 50 and that wraps around the peripheral boundary 56 or edge of the dial plate 42. Although the resin layer 44 is a single molded part, the edge graduation part 54 is at the peripheral boundary 56 of the resin layer 44 or edge portion that joins the rear graduation part 48 and the front graduation part 50. The edge graduation part is where the front graduation part 50 and rear graduation part 48 meet.

Manufacturing the dial 26 is accomplished in part by resin molding the resin layer 44 onto the dial plate 42. In one processing example, a mold is placed around the dial plate 42 that permits resin to be molded onto the dial plate 42 in the preferred shape to create the resin layer 44. An advantage of the resin layer 44 is that sharp edges, such as, but not limited to those formed by surfaces meeting at 90 degree angles, and sharp corners, may be molded into the front graduation part 50 to create edges that make the graduation easier to see and demarcate accompanying indicia. Furthermore, the front graduation part 50 has an elevated surface that is separate from the surface of the dial plate 42 itself thereby creating a three-dimensional surface with the dial plate 42. That is, the top or front surface of the front graduation part 50 is located slightly away from the surface of the dial plate 42 to the extent of the thickness of the front graduation part 50. The sharp edges create a dial 26 that is readily and easily viewable, whether the front graduation part 50 is illuminated or not. Regardless of illumination, a three-dimensional surface by way of the front graduation part 50, is provided. More specifically, with reference to FIG. 5, the front graduation part 50 is depicted as protruding away from the surface of the dial plate 42.

Continuing with FIG. 5, light supplied by light emitting diodes 60, 62 ("LED") mounted to a printed circuit board 64, passes through the dial plate 42 to illuminate the indicia 32, 36 and graduations 34, 38, which may be resident in the dial plate 42 as in traditional gauge faces. As depicted, light 66 from LED 60 may pass through the resin layer 44 and dial plate 42, to illuminate items of the graphic printing layer 46, such as indicia 36. Additionally, light 68 from LED 62 may pass through the resin layer 44 at area 70, as an example, where no graphical printing is evident, and dial plate 42, to illuminate the front graduation part 50. In addition to such light 68, the resin layer 44 may be configured to pass light 72 into the rear graduation part 48, the edge graduation part 54 and finally into the front graduation part 50. Regardless of how the front graduation part 50 is illuminated, a viewer will see the part 50 as a raised, three-dimensional surface illuminated by the wrap-around structure of the rear graduation part 48, edge graduation part 54 and front graduation part 50. To reflect light through the resin layer 44, reflective surface 76 and reflective surface 78 may be painted, hot stamped, taped, or applied with a reflective material to effectively cause the light within the resin layer 44 to be guided around the peripheral boundary 56 of the dial plate 42. As depicted in FIGS. 2 and 5, the surface 74 may be slightly inclined relative to the inner dial 22 or outer dial 24. Another advantage of the resin layer 44 is that because it is injection molded, for example, of resin, sharp angles are achievable, as opposed to a sheet molding process over a die structure. Even with traditional sheet molding that may be processed with a die having edges formed by 90 degree surfaces, the resulting sheet structure formed generally has rounded edges.

Turning to FIG. 6, a dial structure 80 according to another embodiment is depicted. In such a dial structure 80, the surface 74 of the outer dial 24 is angled to a large degree, with respect to surface 82, also part of the outer dial 24. The surface 74 provides an even greater three-dimensional dial structure than the dial structure 40 of FIG. 5. With such a dial structure 80, the front graduation part 50, having an elevated surface 84, may lie around the outer periphery of the dial plate 42. Additionally, the dial plate 42, to which the resin layer 44 is molded, may be molded in a steep angle relative to surface 82.

With the dial structure 80 depicted in FIG. 6, light 86 from LED 60 passes into the resin layer 44 and toward the outer surface 94 or edge graduation part of the resin layer 44. In order to traverse from the rear graduation part 98 to the front graduation part 50 of the resin layer 44, the light 86 may reflect from a surface 90 and then a surface 92, before passing into the front graduation part 50, where the light reflects from the surface 84 such that a viewer may see an illuminated, curved, and three-dimensional front graduation part 50. Similarly, LED 62 may emit light 88 which may then pass into the resin layer 44 to ultimately illuminate the front graduation part 50. The housing 52, as in FIG. 5, may rest upon the resin layer 44, or be positioned slightly above the resin layer 44, and in either position shield the resin layer 44, and specifically, the front graduation part 50, from interference from outside light that might diminish the illuminating effect of the front graduation part 50. One situation is during twilight such as when there may still be an appreciable amount of ambient light yet the LEDs 60, 62 may still be on to illuminate the resin layer 44 and front graduation part 50.

Continuing with the embodiment of FIG. 6, a three-dimensional gauge face having steep dial or face angles relative to an adjacent printed circuit board 64 or inner dial 22 (FIG. 1) is achievable with a three-dimensional front graduation part 50. Specifically, the angles of the outer dial 24 relative to an inner dial 22, or surface 74 relative to a surface 82, permit light 86, 88 to be directed through a single rear side structure such as rear graduation part 98 to a front side structure, such as front graduation part 50. As in the prior example, LEDs 60, 62 on a printed circuit board 64 may provide the light. Angles of the light-transmitting resin layer 44 may be up to 90 degrees with respect to a printed circuit board 64 upon which the LEDs 60, 62 are mounted. As depicted in FIG. 6, the resin layer 44 forms an angle of approximately 80 degrees with a printed circuit board 64. Similar to the embodiment of FIG. 5, the embodiment of FIG. 6 illustrates that light 86, 88 may be passed though the resin layer 44, even when the resin layer is formed at steep angles and/or curved. As with FIG. 5, the front graduation part 50 of FIG. 6 is depicted as protruding away from the front surface of the dial plate 42 to create a three-dimensional, illuminated graduation.

Turning now to FIG. 7, a dial structure 100 according to another embodiment is depicted. In such a dial structure 100, the outer dial 24 is angled with respect to the inner dial 22. More specifically, the surface 74, such as where indicia 36 (FIG. 2) may be depicted, provides additional three-dimensional gauge face features than the dial structure 40 of FIG. 5 because the front graduation part 102 is an overhang or cantilever portion for at least part of the outer dial 24 such that space lies between the front graduation part 102 and the surface 74 of the outer dial 24. Continuing with the dial structure 100, LEDs 60, 62, as representative examples, may emit light 104, 106, 108, to illuminate the indicia and graduations in the surface 74, as in the case of traditional indicia and graduations. Specifically, the LED 60 may emit light 104 that may pass through the dial plate 42 and resin layer 44 to illuminate indicia 36 (FIG. 2) that may lie in the surface 74 of the outer dial 24.

In another example of illumination, the LED 62 may emit light 106, 108 that may pass into the resin layer 44 and travel through the resin layer 44 and into the cantilevered front graduation part 102. FIG. 7 depicts a different structure from that depicted in FIGS. 5 and 6 in so far as the front graduation part 102 is depicted as protruding over and away from the surface of the dial plate 42. In effect, the front graduation part 102 is an overhang portion with respect to the outer dial 24, and more generally, the dial plate 42.

With continued reference to FIG. 7, illumination of the front graduation part 102 may be accomplished with light that travels around the radial end 110, or outer periphery 110 of the dial plate 42. More specifically, LED 60 may emit light 112 that may travel into the resin layer 44, reflect from the dial plate 42 and the exterior surface boundary of the resin layer 44 with the use of a reflective material, such as a coating, paint, or tape, such as an aluminum or metallic based foil applied by heat stamping. In traveling through the bottom length or rear graduation part 114 of the resin layer 44, the light may follow a path similar to that denoted by light 112. Continuing, as the light 112 approaches the dial plate outer periphery 110, the light 112 may reflect from multiple surfaces, such as the surface 116 and surface 118, as depicted. With a reflective material applied at select outward facing surfaces, such as surfaces, 118, 120, the light 112, regardless of how it is directed through the resin layer 44, may be guided around the outer peripheral edge of the dial plate 42 and into and through the front graduation part 102, thereby illuminating the front graduation part.

Continuing with light travel in the structure 100, LED 62 may emit light 106 or light 108 and cause it to be passed into the resin layer 44 en route to the front graduation part 102. More specifically, the light 106 may pass into the resin layer 44 and reflect from surface 122 of the dial plate 42 and around the outer periphery of the dial plate 42 and into the front graduation part 102. In another example, the light 108 may pass into the resin layer 44 and reflect around the outer periphery of the dial plate 42 and into the front graduation part 102. Although the front graduation part 102 itself may be illuminated, because it is cantilevered over the surface 74 of the dial plate 42, the front graduation part 102 may project light onto the surface 74.

Although injection molding may be used to manufacture the resin layers 44, including the front graduation part 50 of FIGS. 5 and 6, slide core tooling may be used to manufacture the front graduation part 102 of FIG. 7. More specifically, the tool 124 may be slid under the front graduation part 102, but above the surface 126 such that the tool 124 may contact the bottom surface 128 of the front graduation part 102 and the surface 126. After completion of the molding of the front graduation part 102, the tool 124 may be slid or moved in accordance with arrow 130, away from the outer peripheral edge, or radial end 110, of the dial plate 42.

With the structures described above, the dial plate 42 and resin layer 44 may be any suitable materials, such as polycarbonates and acrylics, for passing light through them or within them. This means that the materials may be clear, transparent, opaque or a combination of such. Finally, the materials may be further equipped with separate reflective materials to achieve the reflective properties described above and depicted in the drawings to permit light to travel within the resin layer from the rear of the dial plate, around the outer peripheral edge of the dial plate, and to the front graduation part.

What is claimed is:

1. A gauge of a vehicle instrument cluster, the gauge comprising:
   a dial having an inner dial, an outer dial, and a dial outer edge;
   a lighted front surface graduation protruding above a front surface of the dial;
   a lighted rear surface graduation disposed on a rear surface of the dial, wherein the front and rear surface graduations join at the dial outer edge; and
   a light emitting diode to provide illumination to the gauge and through the lighted front and lighted rear surface graduations, wherein light from the light emitting diode passes through the rear surface graduation, through the dial, and into the front surface graduation.

2. The gauge of claim 1, wherein the front surface graduation lies upon the dial.

3. The gauge of claim 2, wherein the front surface graduation is convex from a viewer's perspective.

4. The gauge of claim 1, wherein the front surface graduation is cantilevered over the dial outer edge with only a void between the front surface graduation and the dial outer edge.

5. The gauge of claim 4, wherein the front surface graduation transmits light.

6. The gauge of claim 1, wherein the surface of the front surfaces graduation meet at 90 degree angles.

7. The gauge of claim 1, wherein light from the light emitting diode passes into the rear surface graduation, around the dial outer edge and into the front surface graduation.

8. The gauge of claim 1, wherein the front surface graduation and the rear surface graduation are one piece.

9. A gauge of a vehicle instrument cluster, the gauge comprising:
- a dial having an inner dial, an outer dial, and a dial outer edge;
- a lighted front surface graduation protruding above a front surface of the dial;
- a lighted rear surface graduation disposed on a rear surface of the dial, wherein the front and rear surface graduations join at the dial outer edge; and
- a light emitting diode to provide illumination to the gauge and through the lighted front and lighted rear surface graduations, wherein the outer dial is situated at an angle greater than 20 degrees with respect to the inner dial.

10. The gauge of claim 9, wherein the front surface graduation lies upon the dial.

11. The gauge of claim 10, wherein the front surface graduation is convex from a viewer's perspective.

12. The gauge of claim 9, wherein the front surface graduation is cantilevered over the dial outer edge with only a void between the front surface graduation and the dial outer edge.

13. The gauge of claim 12, wherein the front surface graduation transmits light.

14. The gauge of claim 9, wherein surfaces of the front surface graduation meet at 90 degree angles.

15. The gauge of claim 9, wherein light from the light emitting diode passes into the rear surface graduation, around the dial outer edge and into the front surface graduation.

16. The gauge of claim 9, wherein the front surface graduation and the rear surface graduation are one piece.

* * * * *